United States Patent
Zhang

(10) Patent No.: US 9,729,914 B2
(45) Date of Patent: Aug. 8, 2017

(54) ALLOCATION OF VIDEO RECORDING FUNCTIONALITY

(71) Applicant: Comcast Cable Communications, LLC, Philadelphia, PA (US)

(72) Inventor: Benyuan Zhang, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/887,634

(22) Filed: Oct. 20, 2015

(65) Prior Publication Data
US 2016/0219328 A1    Jul. 28, 2016

Related U.S. Application Data

(63) Continuation of application No. 13/827,331, filed on Mar. 14, 2013, now Pat. No. 9,197,909.

(51) Int. Cl.
| H04N 21/2343 | (2011.01) |
| H04N 21/433 | (2011.01) |
| H04N 21/233 | (2011.01) |
| H04N 21/234 | (2011.01) |
| H04N 21/24 | (2011.01) |
| H04N 21/262 | (2011.01) |
| H04N 21/2662 | (2011.01) |
| H04N 21/274 | (2011.01) |

(52) U.S. Cl.
CPC ....... *H04N 21/4334* (2013.01); *H04N 21/233* (2013.01); *H04N 21/234* (2013.01); *H04N 21/2335* (2013.01); *H04N 21/2343* (2013.01); *H04N 21/23439* (2013.01); *H04N 21/234309* (2013.01); *H04N 21/2408* (2013.01); *H04N 21/2662* (2013.01); *H04N 21/26208* (2013.01); *H04N 21/274* (2013.01)

(58) Field of Classification Search
None
See application file for complete search history.

(56) References Cited

U.S. PATENT DOCUMENTS

| 8,719,879 B2 | 5/2014 | Youssefmir et al. | |
| 2003/0158913 A1* | 8/2003 | Agnoli | H04L 29/06 709/219 |
| 2010/0050225 A1* | 2/2010 | Bennett | H04N 7/16 725/144 |
| 2011/0197237 A1* | 8/2011 | Turner | H04N 21/2343 725/78 |
| 2013/0117418 A1* | 5/2013 | Mutton | H04N 21/8456 709/219 |
| 2014/0237525 A1* | 8/2014 | Rothschild | H04N 21/236 725/92 |

* cited by examiner

*Primary Examiner* — Pankaj Kumar
*Assistant Examiner* — Charles N Hicks
(74) *Attorney, Agent, or Firm* — Banner & Witcoff, Ltd.

(57) ABSTRACT

A system may receive a plurality of requests to record a plurality of programs. Based on these requests, resources may be provisioned for transcoding variable bit rate streams into constant bit rate streams. Resources may be provisioned based on assigning transcoding tasks to an existing set of deployed devices in which the transcoding tasks correspond to the plurality of requests. Resources may further be provisioned based on incrementally deploying an additional device to the existing set of deployed devices when the transcoding capacity reaches a certain level.

20 Claims, 5 Drawing Sheets

ALLOCATION OF VIDEO RECORDING FUNCTIONALITY

CROSS-REFERENCE TO RELATED APPLICATIONS

The present application is a continuation application of U.S. patent application Ser. No. 13/827,331 filed Mar. 14, 2013, and entitled "ALLOCATION OF CLAMPING FUNCTIONALITY," the contents of which are hereby incorporated by reference.

BACKGROUND

Deployment of a content delivery infrastructure requires a service provider to provide the best service possible while minimizing its cost of implementation. When recording and delivering content using a cloud or other network based systems, the number of devices such as transcoding devices used may correspond to the number of programs provided by the service provider.

Hence, it may be beneficial to efficiently allocate or deploy devices such as transcoding devices into the content delivery infrastructure to minimize the service provider's deployment and operational costs.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to some embodiments, a method is described for allocating device resources for a cloud digital video recorder (cDVR) or network digital video recorder (nDVR). The method may include receiving a plurality of requests to record a plurality of programs over a specified time period. In another aspect, the method may further include incrementally provisioning one or more devices to deploy a minimum number of the one or more devices used over the specified time period. The provisioning may be accomplished by successively assigning one or more programs of the plurality of programs to available time slots of a device of the one or more devices until the device of the one or more devices is fully utilized. The provisioning may further be accomplished by successively assigning a remainder of the plurality of programs to each of a remainder of one or more additional devices until all of the plurality of programs are assigned to the minimum number of the one or more devices.

The various aspects of the illustrative embodiments are substantially shown in and/or described in connection with at least one of the following figures, as set forth more completely in the claims. These and other advantages, aspects, and novel features of the present disclosure, as well as details of illustrated embodiments, thereof, will be more fully understood from the following description and drawings.

BRIEF DESCRIPTION OF THE DRAWINGS

Figure 1:
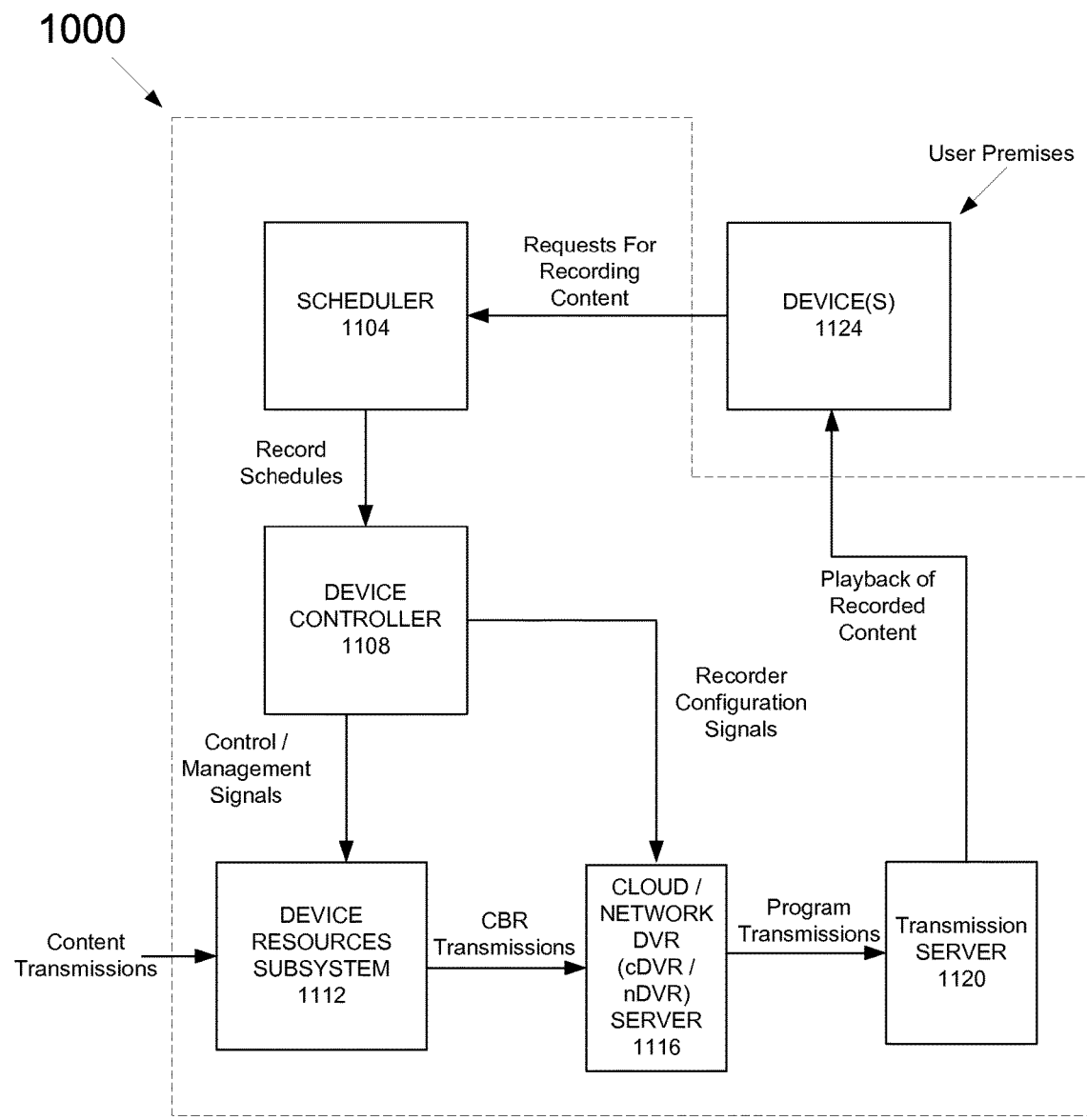

Having thus described aspects of the disclosure in general terms, reference will now be made to the accompanying drawings, which are not necessarily drawn to scale, and wherein:

FIG. 1 illustrates an example content delivery system in which various embodiments may be implemented.

Figure 2:
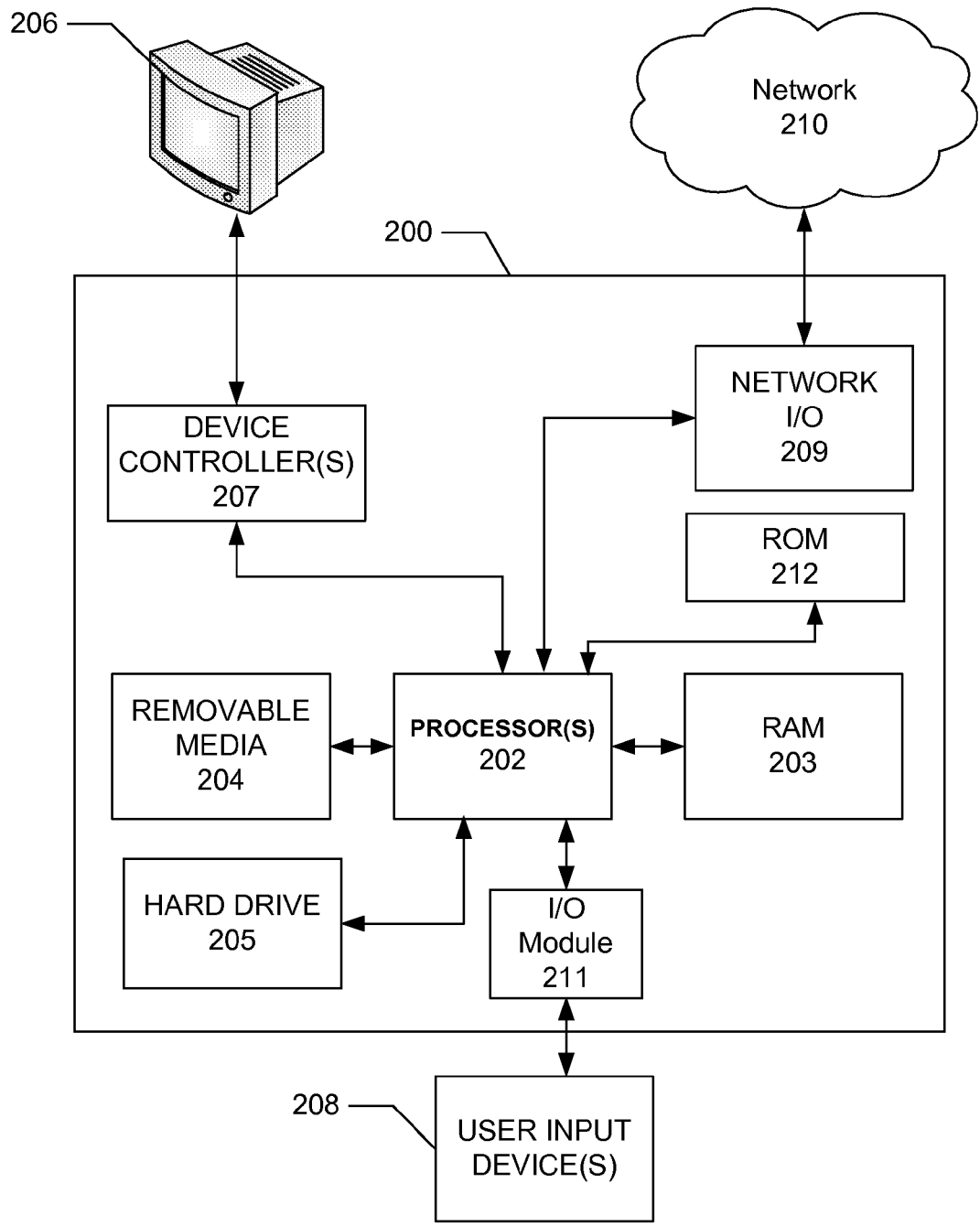

FIG. 2 illustrates general hardware elements that may be used to implement each of the computing devices previously described in connection with FIG. 1.

Figure 3:
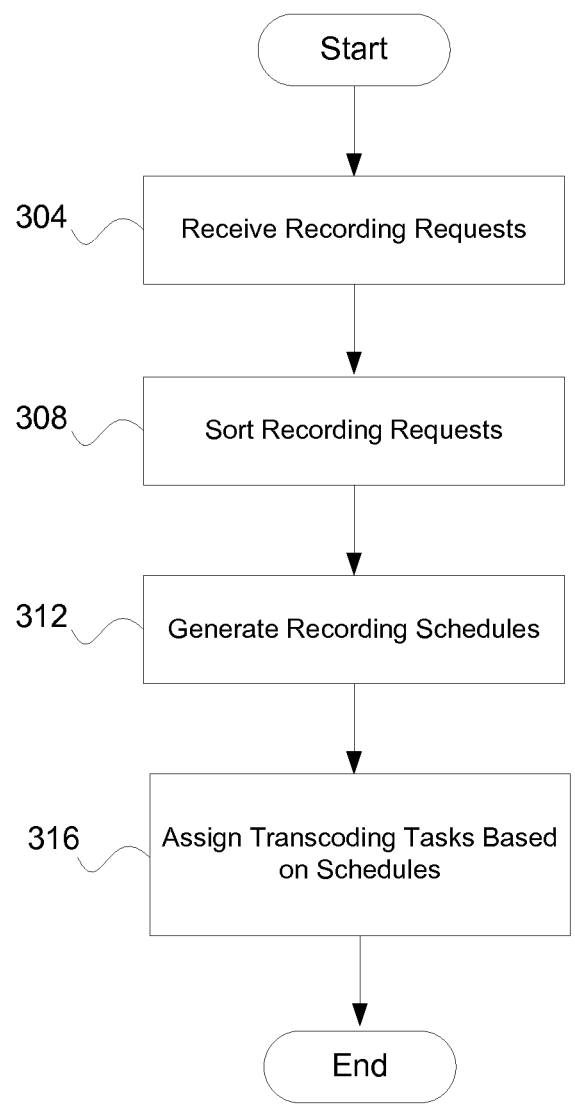

FIG. 3 is an example operational flow diagram of a method for generating schedules and transcoding tasks in accordance with various embodiments.

Figure 4:
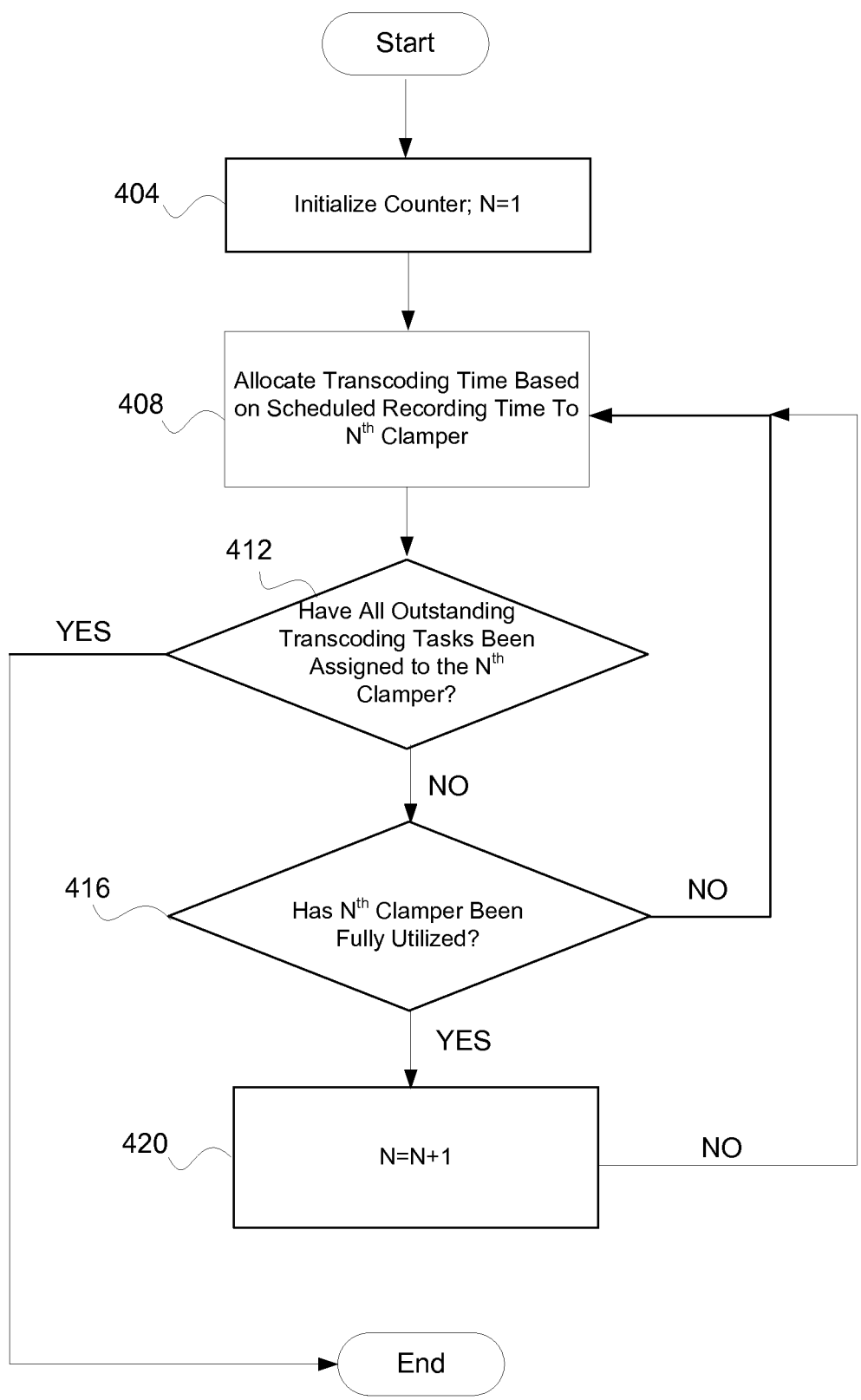

FIG. 4 is an example operational flow diagram of a method for allocating device resources in accordance with various embodiments.

Figure 5:
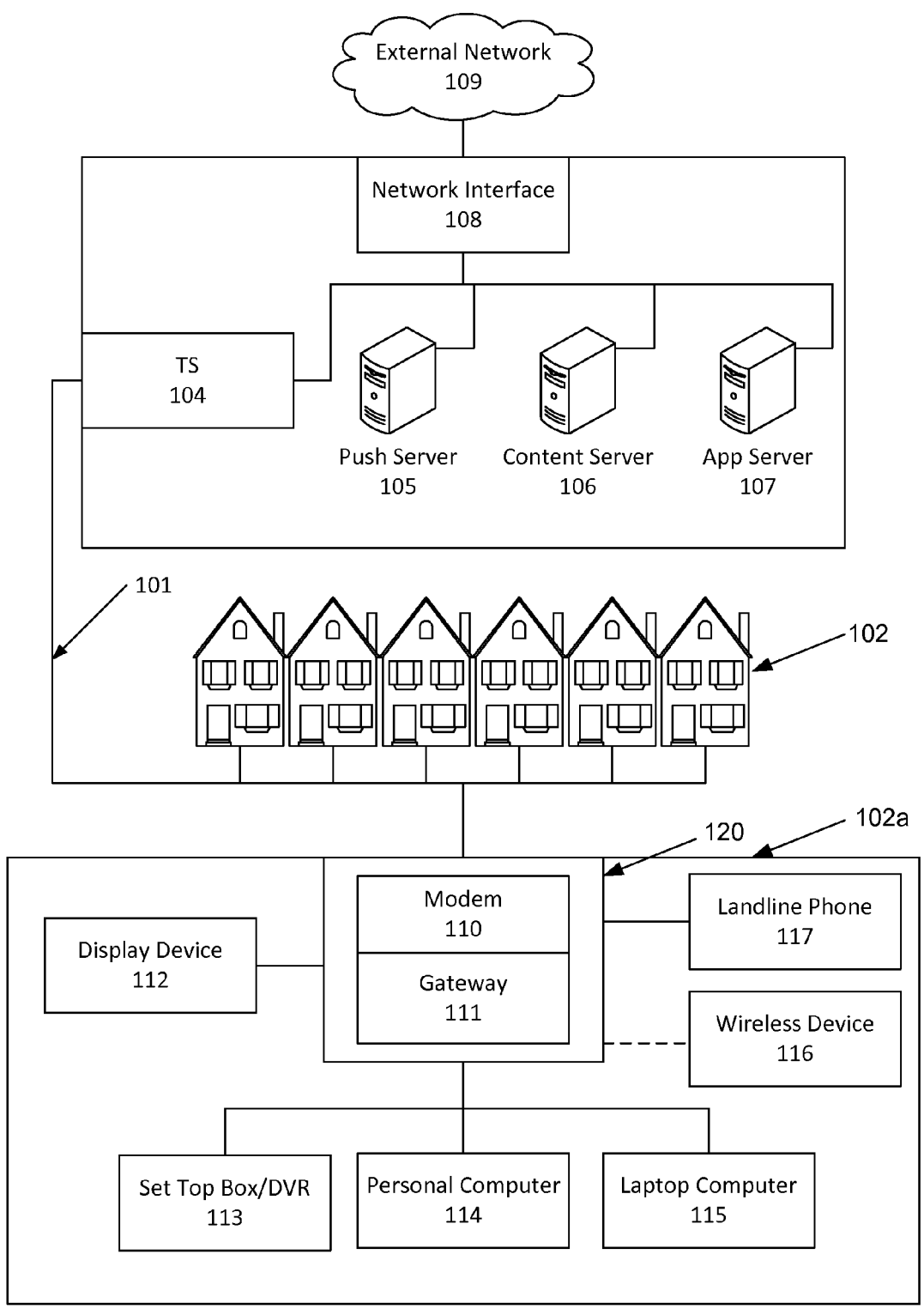

FIG. 5 illustrates an example communication network on which various features described herein may be used.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

A service provider may allocate and deploy device resources based on the content it believes its users may want to record. The devices may by transcoding devices i.e. clampers or other devices for shifting signal values of a transmission. One or more devices may be used to transcode a program stream into a format suitable for recording onto a cloud or network digital video recorder (cDVR or nDVR). The content recorded by one or more users may comprise one or more programs. The programs may comprise news, movie, show, game, and sports programs, for example. Device resources may be dedicated to a program stream to accommodate for the likelihood of a recording request for that program stream. However, device resources may be unused when recording requests for that program are made infrequently by the service provider's users. For example, the demand for recording some type of programs may be low or infrequent for a particular geographic region. When there is little or no request to record a particular stream or program, dedicating device resources for that particular stream may not be an effective use of device resources.

In accordance with various embodiments of this disclosure, the amount of device resources may be measured in terms of the number of devices that are deployed for service in a region. The number of devices used may depend on the number, the type (i.e., resolution type, HD or SD resolution, for example), and the duration of different recording events or different programs requested by users in that region. Described herein are a method, a system or apparatus, and/or a computer program product for efficiently allocating device resources used for recording programs requested by users.

FIG. 1 illustrates an example of a content recording and delivery system 1000 in which various embodiments may be implemented. The system may also store, encode/decode, or otherwise process content. The system 1000 may be deployed and/or operated by a cable operator, a satellite operator, Internet service provider, telecommunications carrier, any multiple system operator (MSO), or any type of content provider. The system 1000 may comprise a scheduler 1104, a device controller 1108, device resources subsystem 1112, a cloud/network digital video recorder (DVR) server 1116, and a streaming server 1120.

The scheduler 1104 may comprise a computing device used for receiving requests for recording one or more programs. The service requests may be made by users of the service provider of the content recording and delivery system 1000. The scheduler 1104 may receive and store service requests from one or more devices (e.g., gateway, set-top-box, modem) located in a plurality of user premises 1124. One or more users of the one or more devices may schedule one or more recordings of one or more programs that may be transmitted (e.g. broadcasted) in the future. When a user of the one or more users schedules a recording, a service request may be transmitted to the scheduler 1104. The scheduler 1104 may store service requests for recording the one or more programs in the future. Recording requests may be compiled by the scheduler 1104. The scheduler 1104 may compile and sort each of the requests into one of a plurality of future time periods. For example, each of the plurality of future time periods may comprise a 24 hour time period. The scheduler 1104 may identify and store each service request using a program identifier (ID) number. The program ID number and other information, such as the time in which the program is to be recorded and the duration of the recording may be stored in a database of the service provider. Based on all service requests it receives, the scheduler 1104 may generate a schedule for a specific 24 hour period of time. The schedule for recording programs may be transmitted to the device controller 1108 (e.g., a controller for a device with signal shifting functionality). The schedule for recording programs may be transmitted to the device controller 1108 through a network by way of a WAN and/or LAN. The communication protocol used may comprise any packet switching protocol, such as the Ethernet protocol, for example.

The device controller 1108 may control and manage the device resources subsystem 1112 by way of using control/management signals, as shown in FIG. 1. The control/management signals may be transmitted through a WAN and/or LAN network by way of an Ethernet connection, for example. The device controller 1108 also may manage the cloud/network DVR (cDVR/nDVR) server 1116 by way of transmitting recorder configuration signals, as shown in FIG. 1. The recorder configuration signals may be transmitted through a network by way of an Ethernet connection, for example. The control/management signals may be used to provision one or more devices in the device resources subsystem 1112. The recorder configuration signals may be used to configure the cloud/network DVR (cDVR/nDVR) server 1116 to allow for proper reception of program streams provided by the device resources subsystem 1112. For example, the recorder configuration signals may provide information such as destination and source IP addresses, MAC addresses, and UDP addresses of the nodes in which the program streams are being transmitted from. Each of the device controller 1108, device resources subsystem 1112, and cloud/network DVR (cDVR/nDVR) server 1116, may comprise a computing device. The computing device may comprise one or more processors and memory.

The device resources subsystem 1112 may comprise a plurality of devices. The device resources subsystem 1112 may receive control/management signals from the device controller 108. The device resources subsystem 1112 may receive content streams from any number of content providers. A plurality of streams may be transmitted from various broadcasting sources. The content streams may comprise variable bit rate (VBR) streams. In a representative embodiment, each of the plurality of streams may comprise a variable bit rate multi-program transport stream (MPTS). For example, each of the content streams may comprise 3:1 VBR MPTS. The control/management signals may be used to specify which content streams should be assigned to a particular device. Each of the content streams may comprise one or more programs that may be viewed.

Each device of the one or more devices may be used by a service provider to transcode a requested program in preparation for recording the program to the nDVR or cDVR. Each device may be used to condition and transcode linearly transmitted programs it receives from a source (e.g., a content provider) before recording is performed by a network/cloud digital video recorder (nDVR or cDVR). The device may transcode the VBR MPTS into narrowcast services for use by a network digital video recorder (nDVR) or cloud based digital video recorder (cDVR). The narrowcast services may comprise one or more unicast constant bit rate (CBR) single program transport streams (SPTS) that are presented to the nDVR or cDVR. The MPTS stream may comprise a number of high definition (HD) or standard definition (SD) programs. Based on the programs requested by users over a specified time period, the device controller 1108 determines which VBR MPTS to assign to a currently used device such that the one or more devices currently deployed by the service provider are efficiently allocated. The resources of a device may be depleted when the device is fully utilized over the specified time period. For example, the device may be completely utilized when there are no further time slots available for transcoding additional VBR streams. In accordance with various aspects of the disclosure, the device controller 108 may facilitate efficient assignment of incoming content streams to one or more currently used devices before an additional device is deployed. By way of maximizing the utilization of each existing device, the number of devices deployed may be minimized. As a consequence, device implementation costs may be minimized. The device controller 1108 may generate a database that comprises device identification information, program identifier (ID) numbers, times in which each of the programs may be broadcasted, and the duration of each of the programs.

The cloud/network DVR (cDVR/nDVR) server 1116 may utilize the information in the database to record the programs at the appropriate time. The cDVR/nDVR server 1116 may receive streams which have been transposed by the device resources subsystem 1112. The streams may comprise constant bit rate (CBR) streams. In a representative embodiment, the streams received by the cDVR/nDVR server 1116 may comprise CBR SPTS streams. The streams may be recorded by the cDVR/nDVR server 1116 using a plurality of storage devices. The service provider may give each user a maximum storage limit to the amount of data it may store in the cDVR or nDVR. The cDVR or nDVR may serve as a centralized repository of recorded programs for all of the service provider's users.

When content, such as a program, is to be played back or otherwise consumed or presented, the streaming server 1120 receives the requested program from the cDVR/nDVR for delivery to one of the devices 1124. The program may be transmitted to one or more devices 1124 located in the user premises by way of the WAN, such as the Internet, for example. The streaming server 1120 may communicate to the one or more devices 1124 located in the user's premise by way of using a coaxial cable connection, for example, or any other type of connection. The streaming server 1120 may comprise a computing device. The computing device may comprise one or more processors and memory.

FIG. 2 illustrates general hardware elements that may be used to implement each of the computing devices previously described in connection with FIG. 1. Each of the computing devices 200 may include one or more processors 202 which may execute instructions of a computer program to perform any of the features described herein in the other figures. The instructions may be stored in any type of computer-readable medium or memory, to configure the operation of the processors 202. For example, instructions may be stored in any type of a memory (e.g., solid state flash, disk, etc.) such as read-only memory (ROM) 212, random access memory (RAM) 203, removable media 204, such as a Universal Serial Bus (USB) drive, compact disk (CD) or digital versatile disk (DVD), floppy disk drive, or any other desired electronic storage medium.

Instead of a general-purpose processor, any of various special-purpose processors such as field-programmable gate arrays (FPGAs) or application-specific integrated circuit (ASICs) may be used to implement the functions described herein. Accordingly, the term "processor" should be understood to refer to all of these and other possible implementations.

Instructions may also be stored in an attached (or internal) hard drive 205 or any other type of memory. The computing device 200 may be communicatively coupled to one or more output devices, such as a display 206 (or an external television), and may include one or more output device controllers 207, such as a video processor. The computing device 200 may include an input/output (I/O) module 211 that is communicatively coupled one or more user input devices 208, such as a remote control, mouse, keypad, keyboard, touch screen, scanner, microphone, optical reader, infrared communication device, Bluetooth communication device, Wi-Fi communication device, near field communication (NFC) device, and/or other input devices through which a user may provide input, and may also include and/or interface with one or more speakers for providing audio output and a video display device for providing textual, audiovisual, and/or graphical output. The computing device 200 may also include one or more network interfaces, such as network input/output circuits 209 (such as a network card) to communicate with an external network 210. The network interface may be a wired interface, wireless interface, or a combination of the two. In some embodiments, the network interface may include a modem (e.g., a cable modem), and the network 210 may correspond to the one or more networks described in connection with FIG. 1. The network 210 may comprise an Ethernet network, for example.

FIG. 3 is an example operational flow diagram of a method for generating schedules and transcoding tasks based on a compilation of user recording requests in accordance with various embodiments.

At step 304, a recording schedule may be generated by a scheduler, as was previously described in connection with FIG. 1, based on recording requests made by users of the service provider. Users may send requests to record programs using their devices. The scheduler may receive and store these requests in a storage device resident in the scheduler. Each of the devices may be controlled by way of a remote control used by its user. The user may wish to record any type of program, such as a movie, a sports event, or a show, for example. The scheduler may be able to identify a request to record a program by way of using user and program identifying information, such as a user number and a program identifier (ID). Based on the requests received by the scheduler, additional information, such as the time the program is broadcast and durations of the program to be broadcast may be stored and used by the scheduler. The recording schedule may be compiled continuously from recording requests made by users of the service provider. The recording schedule may be stored in the data storage device resident in the scheduler.

At step 308, the program recording requests may be categorized or sorted by region based on program ID, geographic location of user, date and time a program is broadcast, and duration of the program. Requests may also be sorted based on whether a program will be recorded daily or periodically. The foregoing information may be stored as data in the one or more schedules generated by the scheduler. The one or more schedules may be used by the device controller to efficiently assign transcoding events to one or more devices. For example, the schedules generated by the scheduler may be used by the device controller to efficiently assign transcoding of requests to respective devices in each region through the device controller's control/management signals. Given a large number of requests, the scheduler and device controller may allocate device resources to maximize a device's transcoding capacity over the 24 hour period. Based on program ID, geographic location of the user making the request, date and time a program is to be broadcast, and duration of the program, as configured by the scheduler and as provided by the one or more schedules, the device controller may efficiently assign transcoding tasks to one or more deployed devices in each region by sequentially filling any available transcoding time slots. In some aspects, all available time slots are used before deploying additional transcoding resources provided by another device.

At step 312, the recording schedules may be generated for the geographic regions. For each geographic region, the scheduler may generate a recording schedule for use by the device controller. The scheduler, for example, may generate a recording schedule for each region for each day of the week. In a representative embodiment, a schedule may be used to assign transcoder tasks daily (i.e., successive 24 hour periods) for each geographic region.

At step 316, transcoding tasks are prepared for a region based on the recording schedule for the region. The device controller may assign transcoding tasks for each device in a region based on the recording schedule. The recording schedule, which may comprise a compilation of all recording requests for a region, may also comprise a database that can be sorted by user number, program identifier (ID), program broadcast time, and program duration. This database may be stored in the device controller. The database may be used to determine whether a recording time for a program overlaps with that of another scheduled program recording. Transcoding assignments may be based on such overlaps. Transcoding tasks may be sorted and assigned such that a maximum number of transcoding tasks are assigned to a device, there are no transcoding task overlaps for the device, and there is a minimum number of time gaps between successive transcoding tasks. The sorting and assignment process efficiently allocates transcoding jobs to existing devices before one or more new devices are further deployed.

As an example, the following programs and their recording times may be compiled by the scheduler:

| Program | Recording Times |
| --- | --- |
| A | 7:00-8:00, 17:00-20:00 |
| B | 3:00-5:00, 13:00-14:00 |
| C | 1:00-1:30, 9:00-10:00, 22:00-23:00 |

Because there is no overlap between each of programs A, B, and C, all three of these programs may be assigned to the first device for transcoding. Thus, device resources are consolidated by tasking the first device to perform transcoding of programs A, B, and C when they are broadcasted. Available program time slots are successively assigned for transcoding by the first device based on additional program recording times compiled by the scheduler. The first device's available time slots are successively filled until only a few available time slots of the first device are available. An additional device may be deployed when device resources of one or more deployed devices has been depleted or exhausted. In one embodiment, an additional device may be allocated when the available capacity of the existing set of one or more deployed devices reaches a certain percentage or percentage range of its transcoding capacity. For example, an additional device may be allocated when the available capacity of the existing set of one or more deployed devices varies in a range between 0 to 10%. In another embodiment, an additional device may be allocated when the available capacity of the existing set of one or more deployed devices reaches and/or dips below a certain threshold value. In the foregoing embodiments, additional device resources may be immediately allocated in response to a recording request from a user.

FIG. 4 is an example operational flow diagram of a method for allocating device resources in a device resources subsystem in accordance with various embodiments.

At step 404, a device counter is initialized by setting the counter index of the device counter to the value 1. The device counter indexes the number of devices that have been deployed in the device resource subsystem. The device counter may be implemented in software of the device resource subsystem, for example, or in any other computing device of the content recording and delivery system.

At step 408, a transcoding task may be assigned to the first device by the device controller. The counter identifies the device used in the transcoding task assignment. A time slot corresponding to the broadcast time of the program may be allocated on the device transcoding schedule. The device's transcoding schedule may be determined on a daily basis, for example.

At step 412, a decision is made concerning whether all outstanding transcoding tasks have been successfully assigned to the $N^{th}$ device. The transcoding tasks may correspond to all scheduled recording requests made for a designated time period. In a representative embodiment, the transcoding tasks may be assigned for a 24 hour time period corresponding to the day in which the programs are to be broadcasted. If all transcoding tasks for the period have been assigned to devices, the device resource allocation process ends. Otherwise, the process proceeds with step 416.

At step 416, a decision is made concerning whether the $N^{th}$ device has been fully utilized. A device may be fully utilized if the transcoding capacity of the deployed devices is low. When the capacity of the deployed devices cannot accommodate additional transcoding tasks, the $N^{th}$ device may be considered fully utilized. If the first device has not been fully utilized, the process reverts back to step 408 where an additional transcoding task corresponding to a record request may be assigned to the first device for transcoding. Otherwise, the process continues with step 420.

At step 420, the device counter is incremented by one and an additional device is deployed for use by the content recording and delivery system. For example, after the first device had been fully utilized, a second device may be deployed. Then, the process reverts back to step 408 where the process previously described is continued.

FIG. 5 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be one or more computing devices configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be one or more computing devices configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be one or more computing devices that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Although not required, one of ordinary skill in the art will appreciate that the various aspects described herein may be embodied as a method, a computer system or computing device, or as a computer-readable storage media for storing software or a computer program comprising computer-executable instructions that are capable of being executed by at least one processor of a computer system. Aspects of the invention have been described in terms of illustrative embodiments thereof. Numerous other embodiments, modifications, and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:
    receiving, at a computing device, a request for recording a first program of a plurality of programs, wherein the first program has been scheduled for transmission at a scheduled transmission time;
    determining a transcoder that will have, at the scheduled transmission time, availability to transcode the first program;
    transmitting, to the transcoder, a control signal for transcoding the first program into a transcoded first program; and
    transmitting, to a digital video recorder (DVR), a recorder configuration signal for recording the transcoded first program, wherein the recorder configuration signal comprises information enabling the DVR to receive, from the transcoder via a network, the transcoded first program.

2. The method of claim 1, wherein the determining the transcoder that will have availability to transcode the first program comprises:
    determining that the transcoder is not scheduled to transcode another program at the scheduled transmission time.

3. The method of claim 2, wherein the determining the transcoder that will have availability to transcode the first program further comprises determining that the transcoder will have, at the scheduled transmission time, a utilization below a threshold.

4. The method of claim 1, wherein the transcoder is a first transcoder, the method further comprising:
    in response to determining that the first transcoder will not have availability to transcode a second program of the plurality of programs, determining a second transcoder that will have availability to transcode the second program; and transmitting a control signal to the second transcoder for transcoding the second program into a transcoded second program.

5. The method of claim 1, wherein the request comprises a program identifier, a start time corresponding to the scheduled transmission time and a duration.

6. The method of claim 5, wherein the start time and the duration correspond to a scheduled broadcast of the first program.

7. The method of claim 1, wherein the control signal comprises an indication of a program identifier, a start time corresponding to the scheduled transmission time and a duration associated with the first program.

8. The method of claim 1, wherein the recorder configuration signal comprises at least one of an IP address and a MAC address associated with a transmission of the transcoded first program.

9. The method of claim 1, wherein the request comprises an indication of a geographic region, and wherein the determining the transcoder further comprises determining the transcoder corresponding to the geographic region.

10. The method of claim 1, wherein the first program comprises a broadcast program and wherein the control signal causes the transcoder to transcode the broadcast program.

11. The method of claim 10, wherein the broadcast program comprises a variable bit rate stream and wherein the control signal causes the transcoder to output a constant bit rate stream.

12. A method comprising:
receiving, at a computing device, a schedule for recording a first program of a plurality of programs, wherein the schedule comprises a program identifier, a scheduled start time and duration associated with the first program;
determining one or more transcoders that will have, at the scheduled start time, availability to transcode the first program;
transmitting a control signal to a first transcoder of the one or more transcoders, wherein the control signal comprises an indication of the program identifier, the scheduled start time and the duration associated with the first program; and
transmitting a recorder configuration signal to a digital video recorder (DVR), wherein the recorder configuration signal enables the DVR to record a stream, output by the first transcoder, of a transcoded version of the first program.

13. The method of claim 12, further comprising:
in response to determining that the first transcoder will not have availability to transcode a second program of the plurality of programs, determining a second transcoder that will have availability to transcode the second program; and
transmitting a control signal to the second transcoder for transcoding the second program into a transcoded version of the second program.

14. The method of claim 12, wherein the determining the one or more transcoders that will have availability to transcode the first program comprises:
determining that the one or more transcoders are not scheduled to transcode another program at the scheduled start.

15. The method of claim 14, wherein the determining the one or more transcoders that will have availability to transcode the first program further comprises determining that the one or more transcoders each will have, at the scheduled start time, a utilization below a threshold.

16. A method comprising:
receiving, at a computing device, a schedule for recording a first program of a plurality of programs, wherein the schedule comprises a program identifier, a scheduled start time and a duration associated with the first program;
determining whether a currently used transcoder will have, at the scheduled start time, availability to transcode the first program;
in response to determining that the currently used transcoder will have availability, transmitting a control signal to the currently used transcoder, wherein the control signal comprises an indication of the program identifier, the scheduled start time and an end time associated with the first program;
in response to determining that the currently used transcoder will not have availability, transmitting the control signal to a second transcoder; and
transmitting, to a digital video recorder (DVR), a recorder configuration signal, wherein the recorder configuration signal enables the DVR to record a stream comprising a transcoded version of the first program.

17. The method of claim 16, wherein the determining whether the currently used transcoder will have availability to transcode the first program comprises:
determining whether the currently used transcoder is scheduled to transcode another program at the scheduled start time.

18. The method of claim 17, wherein the determining whether the currently used transcoder will have availability to transcode the first program further comprises determining that the currently used transcoder will have, at the scheduled start time, a utilization below a threshold.

19. The method of claim 16, wherein the recorder configuration signal comprises at least one of an IP address and a MAC address associated with a stream comprising the transcoded version of the first program, wherein the at least one of the IP address and the MAC address are based on the determining.

20. The method of claim 16, wherein the first program comprises a broadcast program in a variable bit rate stream and wherein the stream comprising the transcoded version of the first program comprises a constant bit rate stream.

* * * * *

UNITED STATES PATENT AND TRADEMARK OFFICE
CERTIFICATE OF CORRECTION

| | |
|---|---|
| PATENT NO. | : 9,729,914 B2 |
| APPLICATION NO. | : 14/887634 |
| DATED | : August 8, 2017 |
| INVENTOR(S) | : Benyuan Zhang |

It is certified that error appears in the above-identified patent and that said Letters Patent is hereby corrected as shown below:

In the Drawings

Sheet 5 of 5, Reference Numeral 113, Line 1:
Delete "Set Top Box/DVR" and insert --Set-Top Box/DVR--

In the Specification

Column 3, Detailed Description, Line 59:
Delete "108." and insert --1108.--

Column 4, Detailed Description, Line 28:
Delete "108" and insert --1108--

In the Claims

Column 12, Claim 14, Line 6:
Delete "start." and insert --start time.--

Signed and Sealed this
Twelfth Day of March, 2019

Andrei Iancu
*Director of the United States Patent and Trademark Office*